United States Patent [19]

Monsen

[11] 4,328,585
[45] May 4, 1982

[54] FAST ADAPTING FADING CHANNEL EQUALIZER

[75] Inventor: Peter Monsen, Stow, Mass.

[73] Assignee: Signatron, Inc., Lexington, Mass.

[21] Appl. No.: 136,543

[22] Filed: Apr. 2, 1980

[51] Int. Cl.$^3$ .................. H04B 7/08; H03K 5/159
[52] U.S. Cl. .................................. 375/14; 375/100; 455/139
[58] Field of Search ............... 179/16 EA; 333/18; 364/724; 375/14, 15, 16, 18, 100, 96, 103; 455/137, 138, 52, 139

[56] References Cited

U.S. PATENT DOCUMENTS

| | | | |
|---|---|---|---|
| 2,457,974 | 1/1949 | Bliss | 375/100 |
| 3,414,819 | 12/1968 | Lucky | 375/16 |
| 4,186,347 | 1/1980 | Frosch | 375/100 |
| 4,271,525 | 6/1981 | Watanabe | 375/14 |
| 4,281,411 | 7/1981 | Bonn et al. | 375/100 |

Primary Examiner—Benedict V. Safourek
Attorney, Agent, or Firm—Robert F. O'Connell

[57] ABSTRACT

A receiver system for processing diversity channel signals to substantially eliminate future and past intersymbol interference (ISI) in received signals which have been transmitted through a time-varying frequency selective transmission medium. The system includes lattice filter means which provide forward error residual signals which are used for generating uncorrelated adaptive weighting signals which eliminate future ISI and decision feedback circuitry which provide uncorrelated adaptive weighting signals which eliminate past ISI.

11 Claims, 10 Drawing Figures

DIVERSITY COMBINING FILTER 10

FAST ADAPTING FADING CHANNEL EQUALIZER

INTRODUCTION

This invention relates generally to data communication systems and, more particularly, to communication system receivers for use in receiving signals which have been transmitted through a time-varying frequency selective transmission medium, such as a fading multipath medium.

BACKGROUND OF THE INVENTION

In multipath transmission systems, such as those which utilize troposcatter or high frequency (e.g. 3-30 MHz) communication links, for example, the transmitted signal is conveyed through a medium along a plurality of paths of differing lengths so that a plurality of signals, each representing the transmitted signal but having varying energy contents, are received at the receiver at different times depending on the length of each particular transmission path in the medium. In some applications redundant, or diversity, channels each containing a plurality of differing path lengths are used to decrease the vulnerability to fading effects.

A general discussion of such communication systems and the problems associated therewith can be found in a recently issued paper "Fading Channel Communications" by Peter Monsen, published in IEEE Communications Magazine, January 1980, pages 16-25. Such paper discusses general approaches to receivers for use in such circumstances and particularly discusses various prior art approaches to adaptive receiver structures, particularly for preventing intersymbol interference.

A more specific discussion of a particular communications receiver for processing received diversity signals and eliminating intersymbol interference is described in U.S. Pat. No. 3,879,664, issued Apr. 22, 1975 to Peter Monsen. In such system the receiver utilizes a forward adaptive filter equalizer, having a plurality of weighting sections, in each of the receiver diversity channels for processing each of the received diversity signals. The combined weighted output signal is used to reconstruct the transmitted data and to generate an error signal. The error signal is used to derive appropriate adaptive weighting signals for use in the processing of the received diversity signals at each of the forward filter equalizers. The forward filter equalizers provide for appropriate matched filtering of the received signals and tend to reduce future intersymbol interference. The system further utilizes a single backward filter equalizer which suitably processes the reconstructed data to form a cancellation signal which is effectively used to eliminate past intersymbol interference. The same error signal is also used to derive appropriate weighting signals in the backward filter equalizer.

While such a system as described in the aforementioned issued U.S. patent has been found extremely useful in troposcatter applications, in some applications the adaptive filter techniques do not provide a sufficiently fast convergence process so that errors due to intersymbol interference are not reduced as quickly as is desirable in some cases. For example, the particular system described therein becomes less helpful in high frequency digital data communication systems because the ratio of data rate to channel rate of change is not so large as to provide sufficient learning time for proper adaptation. Relatively slow convergence of the adaptive techniques tends to occur because the weighting signals within the forward and backward filter equalizer circuits are correlated so that the error signal that causes a change in one weight will tend to change the weights in the other components of the filter.

Accordingly, for high frequency data communication receivers it is desirable to provide an adaptive filter technique design which promotes faster convergence by reducing or eliminating the correlation between the weighting signal components.

SUMMARY OF THE INVENTION

In accordance with the invention, a high speed digital communication receiver avoids the problem of slow convergence by partitioning the functions normally performed by the forward filter equalizer circuitry of the aforementioned prior art system. Thus, the matched filtering process is separated from the future intersymbol interference correction process by utilizing independent circuits for performing each function. A diversity combining filter utilizing a plurality of separate adaptive matched filters within each diversity channel performs the matched filtering process by producing a time inverse of the impulse response of the input signals thereto which are appropriately summed to produce a matched filter output. A suitable intersymbol interference correction circuit utilizing lattice filter and decision feedback techniques for performing both future and past intersymbol interference elimination can then be utilized separately from the diversity combining filter system. In some operations, the matched filtering operation may not even be necessary and conventional diversity data handling techniques may be used to supply the intersymbol interference correction circuitry. As discussed in more detail below, the lattice filter operation is arranged so that forward error residuals generated therein rather than backward error residuals therein are utilized for intersymbol interference correction to avoid correlation between the weighting functions of the lattice filter.

In one particular embodiment of the invention, the intersymbol interference correction circuitry can be formed by the combination of a lattice filter circuit for eliminating future intersymbol interference and a backward filter equalizer circuit for eliminating past intersymbol interference. The weighting signal functions in the lattice filter are arranged to be uncorrelated with each other so that convergence can be achieved at a higher rate than in previously suggested intersymbol interference correction circuitry.

While there may be some coupling between the forward lattice filter and the backward filter equalizer circuits, such coupling is normally not sufficiently high so as to adversely affect the convergence process. However, in applications where it is desired to fully eliminate such coupling a more complicated lattice filter system using unique decision feedback circuitry for eliminating both future and past intersymbol interference can be utilized in another embodiment of the invention. All of the weighting signals of the overall circuitry are uncorrelated and error convergence is optimized so as to avoid any adverse coupling in accordance with the invention. In such system the use of a backward filter equalizer circuit can be eliminated.

DESCRIPTION OF THE INVENTION

Particular embodiments of the invention can be better understood with the help of the accompanying drawings wherein.

Figure 1:
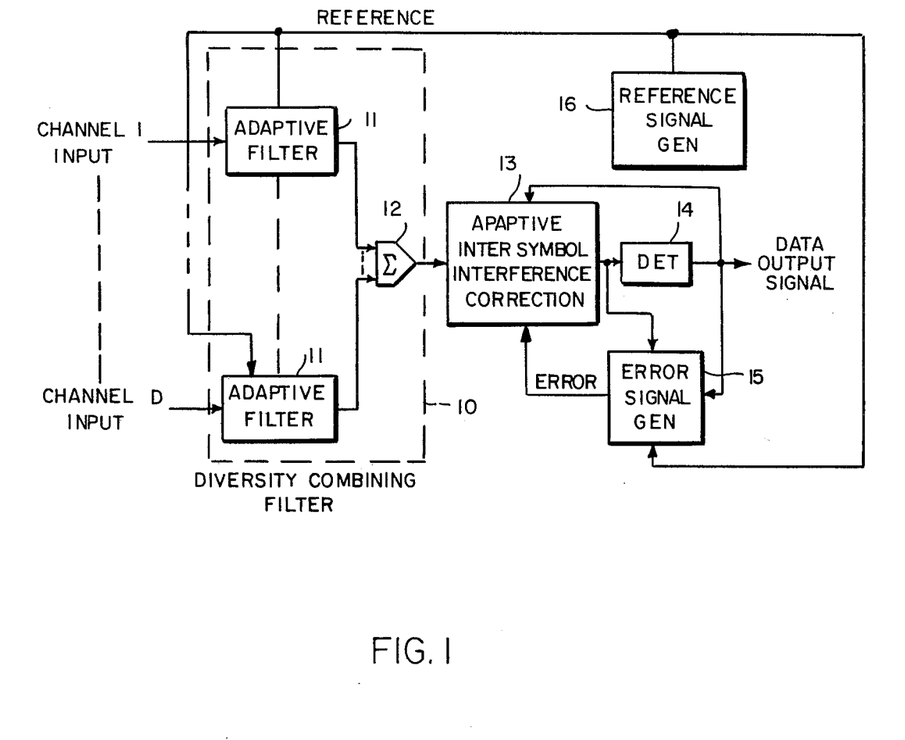
FIG. 1 shows a broad block diagram of a receiver system in accordance with the invention.

FIG. 1 shows a broad block diagram of the invention wherein a plurality of diversity input signals are received at a plurality of channels identified as channels 1 through D which input signals are supplied to a diversity combining filter 10. The latter filter comprises a plurality of separate adaptive matched filters 11, one associated with each of the input diversity channels. The outputs of the adaptive matched filters 11 are appropriately added in summation circuitry 12 to provide a combined diversity filter signal at the output thereof. At that stage no intersymbol interference correction has been achieved.

The diversity combining filter output is supplied to an adaptive intersymbol interference correction circuit 13 the output of which is supplied to a data detector circuit 14 which produces a quantized data output signal as shown. A suitable error signal generator 15, discussed in more detail below, provides an error signal which can be supplied to the adaptive intersymbol interference correction circuit 13 to derive appropriate weighting signals therein for the intersymbol interference correction process.

A suitable reference signal generator 16, discussed in more detail below, supplies a reference signal to the adaptive matched filters 11 from which appropriate weighting signals can be derived for the adaptive filter operation.

Thus, the system of FIG. 1 "partitions" or separates the intersymbol interference correction function from the matched filtering function and such configuration can be utilized to provide improved error convergence of these separate functions to result in an overall speed improvement in the system. Implementation of the specific circuitry involved in FIG. 1 is discussed in more detail below.

Figure 2:
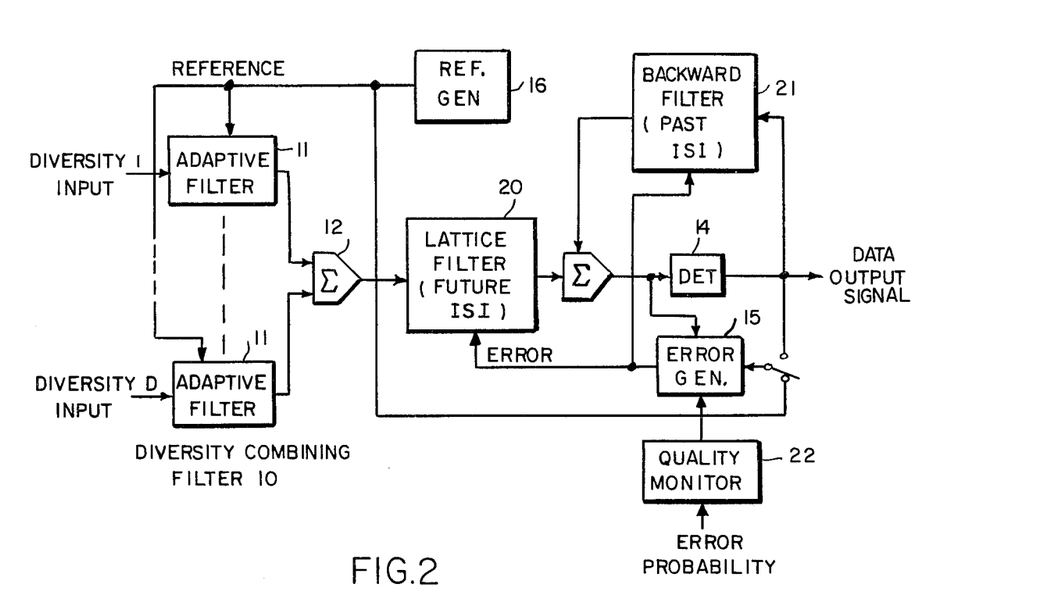
FIG. 2 shows a more specific block diagram of one embodiment of the system of FIG. 1.

FIG. 2 shows a block diagram of one appropriate embodiment of the adaptive intersymbol interference correction circuitry 13. As seen therein, such circuitry can be implemented by utilizing a lattice filter 20 to eliminate future intersymbol interference (sometimes hereinafter referred to as future ISI) and a backward filter equalizer 21 to eliminate past intersymbol interference (past ISI). Error generator 15 provides the appropriate error signal for adapting the weights of the lattice filter and backward filter circuitry, as described in more detail below.

The error can be generated in response to the quantized output decision data or in response to a reference signal from reference generator 16. When the error is supplied in response to the decision data, the quality of the error probability, e.g., the reference error rate, is monitored so that, if the quality falls below a suitably selected threshold, the error is made zero. So long as the error is generated in response to the reference signal or so long as the error is generated in response to the decision data and the quality of the error rate is above the selected threshold, the error as derived by the error generator 15 is supplied to the intersymbol correction circuitry of FIG. 2 or FIG. 3 as shown.

In each of the lattice filter circuit 20 and the backward filter equalizer circuit 21 the circuits are arranged so that the weighting signal components in each circuit are effectively uncorrelated so that when the error signal changes one weight it does not affect the weights in the rest of the filter. As a result of this uncorrelation, maximum rate adaptation of each weight within each filter can proceed without undue influences on other weights. However, there may be some coupling between the lattice filter operation and the backward filter operation which, in some cases, may be undesirable, although in most applications such coupling would be so small as to have little or no significance.

In cases where it is further desired to uncouple the weight adaptation between these two filters a more complex lattice filter may be utilized and the separate backward filter as shown in FIG. 2 can be eliminated. Such a system is shown by the block diagram of FIG. 3 wherein a more complicated lattice filter circuit 25 can be utilized to eliminate both future and past intersymbol interference, all of the weight signals of such lattice filter being essentially uncorrelated with each other so that when the error signal changes any one weight there is no effect on the value of any of the other adaptively selected weights thereof. While the avoidance of the circuit coupling of FIG. 2 is essentially eliminated by the circuitry of FIG. 3, the configuration and implementation of lattice filter 25 becomes more complicated and requires a larger number of weighted components in order to achieve such operation.

Figure 3:
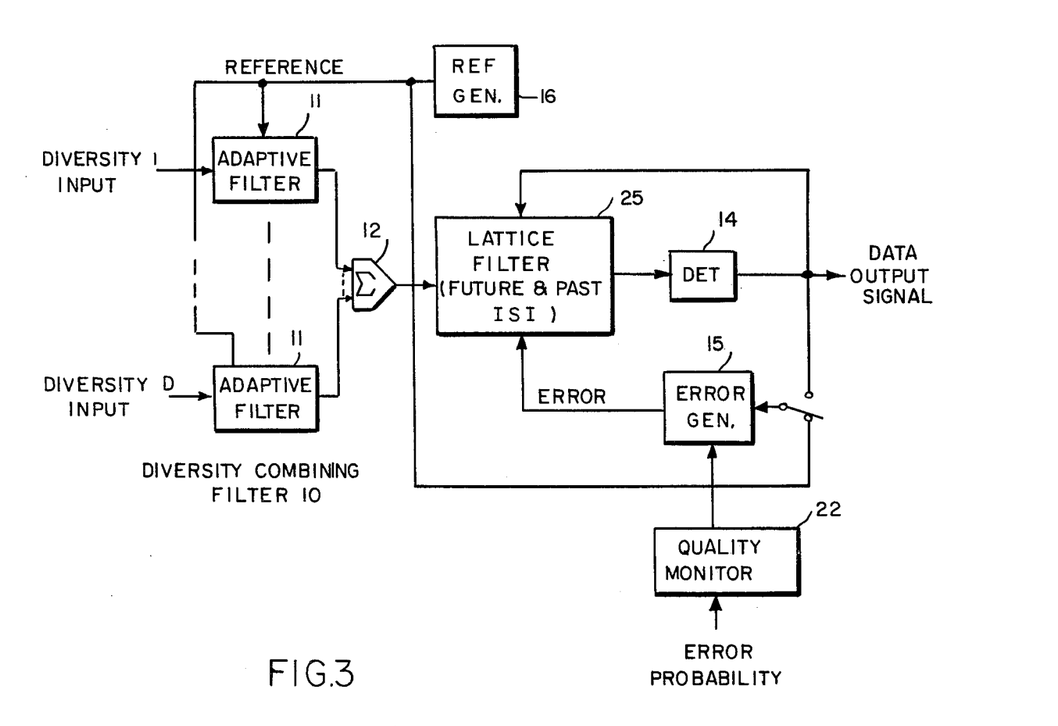
FIG. 3 shows a more specific block diagram of an alternative embodiment of the system of FIG. 1.

Specific implementations of the particular systems and portions thereof discussed in FIGS. 1–3 are shown in FIGS. 4–10.

Figure 4:
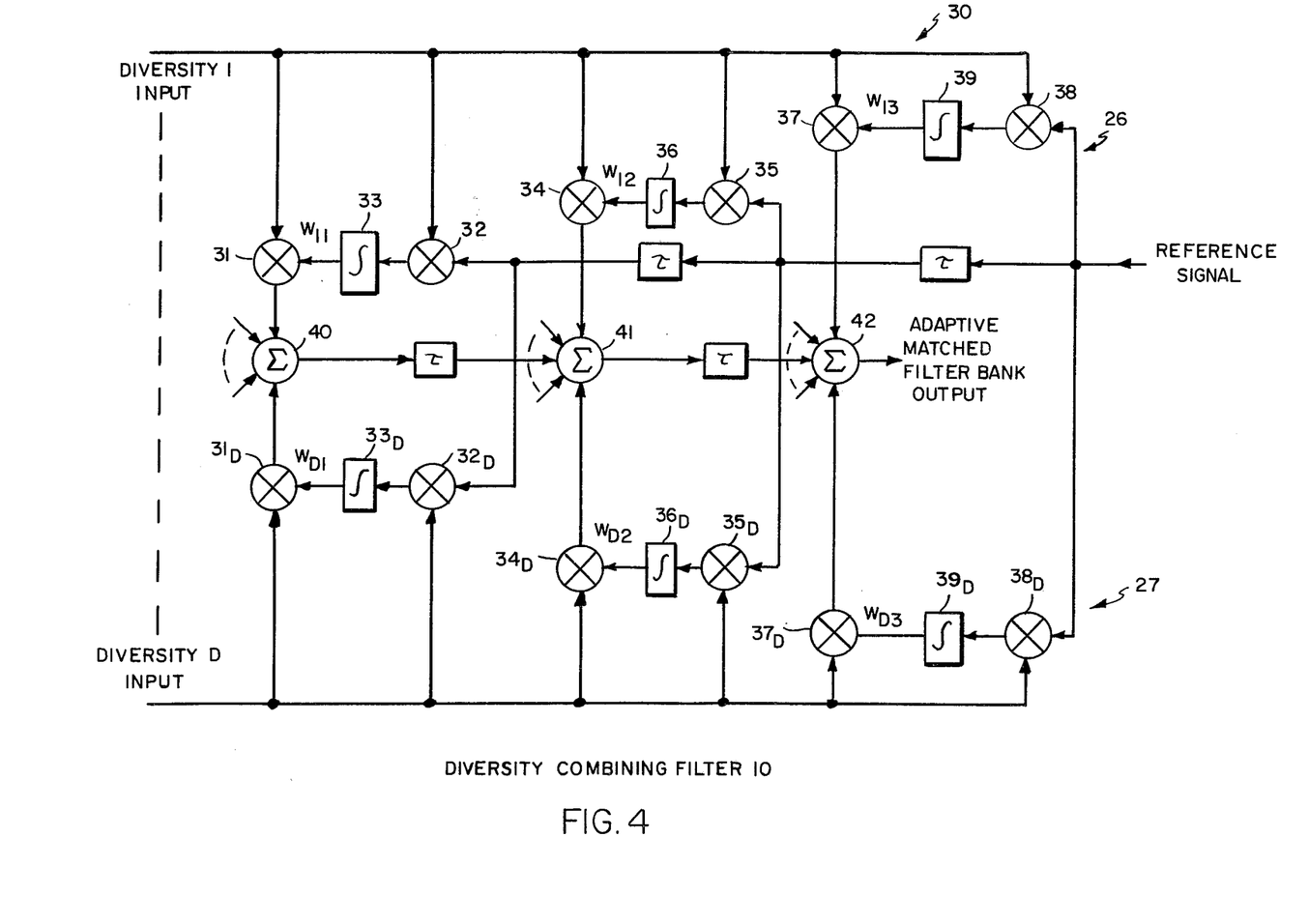
FIG. 4 shows a more specific diagram of an embodiment of the diversity combining filter of FIGS. 2 and 3.

FIG. 4 shows a block diagram of an implementation of the diversity combining filter 10 of FIGS. 1–3. As can be seen therein, the block diagram shows two specific adaptive filters for the first diversity channel 26 which responds to a first diversity receiver signal identified as "Diversity 1 Input" and for the D'th diversity channel 27 which responds to the "Diversity D Input" signal. Intermediate channels each having similar configurations to those shown for the above two channels being used for channels 2 through (D-1), all of such channel signals being appropriately summed as required to produce the adaptive matched filter output signal from the overall band of filter circuits. In the specific embodiment depicted, the adaptive matched filters are shown as having three filter tap outputs, although it would be clear to those in the art that such circuitry need not be specifically limited to that number, the number being appropriately selected for the particular application involved, there generally being N taps for each filter.

Referring to the three-tap adaptive matched filter of the first diversity channel 26, such filter comprises a tapped delay line 30 comprising in the particular implementation shown three taps separated by delays of $\tau$. The input signal at the undelayed tap is supplied to a multiplier 31 and also to a multiplier 32. The input signal is multiplied by a weighting coefficient identified as $W_{11}$ for the undelayed input signal at multiplier 31. Such weighting function is derived from the multiplication of such input signal and a reference signal supplied from reference generator 16 (FIGS. 1-3) which has been appropriately delayed by $2\tau$ as shown. The output of multiplier 32 is supplied to an integrator circuit 33 (such as a suitable resistance-capacitance circuit) for smoothing the multiplier output signal to produce the weighted signal $W_{11}$. The weighted output of multiplier 31 is then added to each of similar signals obtained from the other diversity channels at a summation circuit 39. For example, the weighted signal from the D'th diversity channel, $W_{D1}$, is used to provide a weighted output signal at the output of a multiplier $31_D$ by weighting the diversity D input signal to produce such output signal for summing with the output of multiplier 31. In a similar manner undelayed weighted signals are supplied to summation circuit 39 from each of the remaining diversity channels 2 through D-1. In a similar manner a delayed input signal (delayed by $\tau$) is appropriately weighted at multiplier 34 by weighting signal $W_{12}$ in the first diversity channel 26 and is supplied to summation network 41. Such signal is then appropriately added to similar weighted signals supplied from the remaining channels as well as a time delayed output signal from summation circuit 39. Thus, for the D'th channel the diversity input signal thereto is weighted by weighting coefficient $W_{D2}$ for supply to summation circuit 41. The adaptive weights $W_{12}$ through $W_{D2}$ are suitably derived from the reference signal via appropriate multipliers and integrated circuits such as multiplier 35 and integrated circuit 36 with reference to first diversity channel 26, for example.

Further, the tapped delay output signal (delayed by $2\tau$) at the input of diversity channel 26 is appropriately weighted by a weighting coefficient $W_{13}$ at multiplier 37 for supply to summation circuit 42. Weighting function $W_{13}$ is appropriately derived from the reference signal via multiplier 38 and integrater 39 as before. The output of multiplier 37 is appropriately summed with similar outputs from corresponding multipliers in the remaining diversity channels such as the otuput of multiplier $37_D$, the D'th channel output being appropriately weighted by weighting coefficient $W_{D3}$. The output of summation circuit 42 then provides the adaptive matched filter bank output signal of the diversity combining filter for supply to the adaptive intersymbol interference correction circuitry as discussed above.

The correlation operations to form the weighting coefficient $W_{ij}$ (where i represents the diversity channel and j represents the tap number) can also be performed by a time shared system which updates one coefficient at a time using a reference generator at the receiver which has a clock offset with respect to the transmitter reference sequence clock. As the two clocks slide by each other in one clock offset period, all the weights in each diversity are generated within that period. Successive periods are used for weight averaging. The method of performing correlation operations with reference generators using offset clocks is well known in the art.

In a preferred embodiment the adaptive matched filter operation may be performed at intermediate frequency and the output therefrom provided to an appropriate demodulating circuit for conversion to baseband frequency. Alternatively, the diversity input signals may be demodulated initially and the adaptive matched filtering operation performed at baseband frequency.

The adaptive intersymbol interference correction circuitry 13 can be implemented in accordance with one of two alternative techniques as has been shown in FIGS. 2 and 3. In each embodiment the system uses a lattice filter configuration together with suitable decision feedback circuitry. The decision feedback operations thereof can be contrasted with systems which utilize merely decision directed operations. Thus, a system which uses "decision feedback" operation can be defined as one in which the decision output signal (e.g., the data output signal from detector 14) is used to derive the weights used in the signal processing path which processes the input data signal. A system which uses "decision directed" operation (sometimes referred to as "decision directed adaptation") can be defined as one in which the decision output signal is used to determine certain parameters used in the processing of the input data signal but which does not determine any weights in the signal processing path itself.

Figure 5:
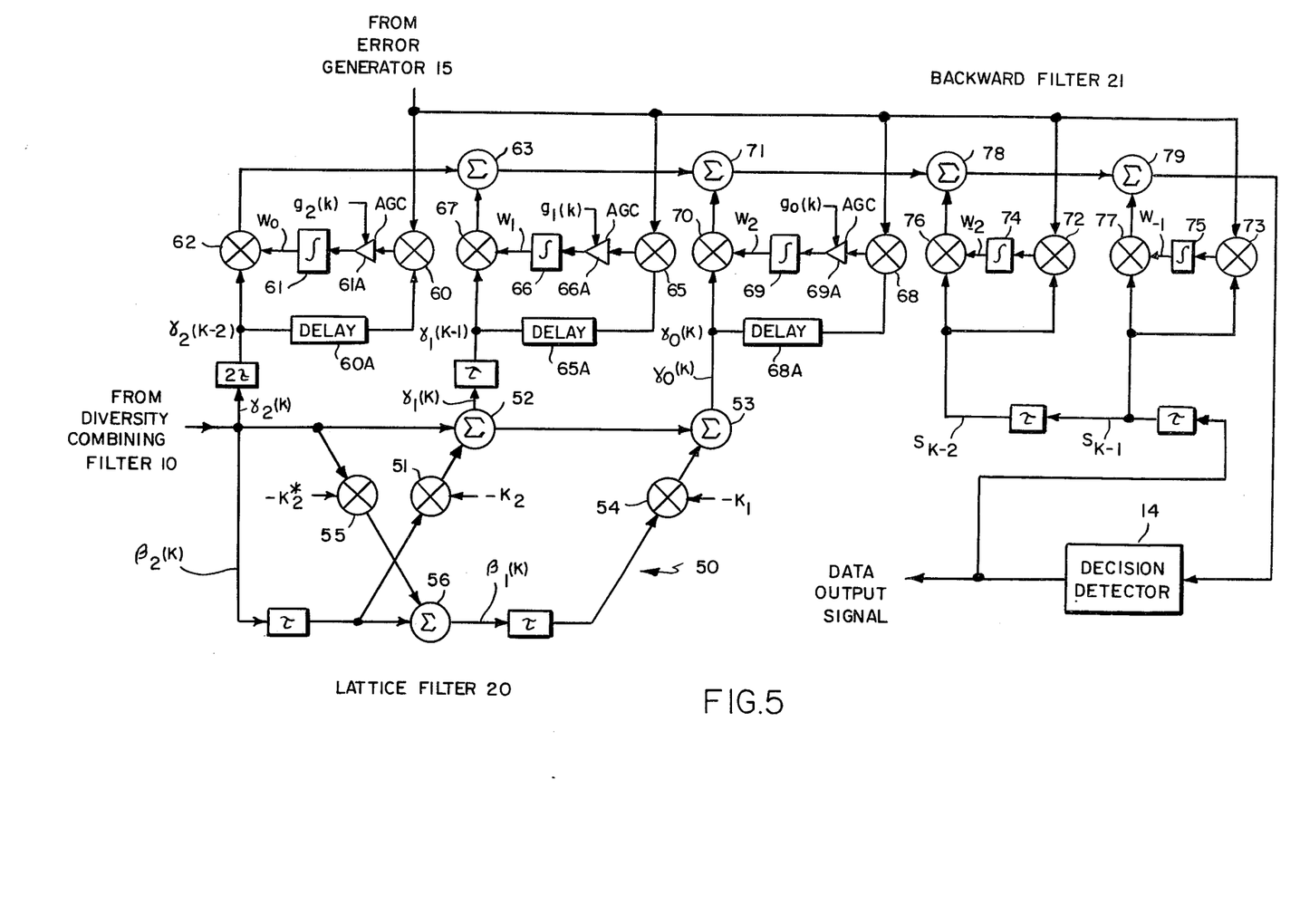
FIG. 5 shows a more specific block diagram of a portion of the system of FIG. 2.

FIG. 5 represents a specific implementation of the embodiment of FIG. 2 in which a lattice filter 20 is used for eliminating future ISI and a backward filter equalizer circuit 21 is used as a decision feedback circuit for eliminating past ISI. As can be seen in FIG. 5, the adaptive matched filter signal (appropriately demodulated either prior to the adaptive matched filtering operation or subsequent to such operation as discussed above) is received at lattice filter 20 from the diversity combining filter. Lattice filter 20 performs the function of eliminating future intersymbol interference by producing forward error residuals from lattice filter circuitry portion 50, as discussed in more detail below. The input signal from filter bank 10 is delayed by $\tau$ and the delayed signal is appropriately weighted at multiplier 51 by a suitable weighting reflection coefficient identified as $-K_2$ and combined at summation circuit 52 with the input signal directly supplied thereto. The output of summation circuit 52 can be referred to as delayed forward error residual, $\gamma_1(k)$. An undelayed forward error residual, $\gamma_2(k)$, is effectively represented by the input signal from diversity combiner filter 10. Another delayed forward error residual, $\gamma_0(k)$, is provided at the output of summation circuit 53. The latter signal is derived from the summation of the output of summation network 52 and the output of multiplier 54. One input of multiplier 54 is obtained as follows.

The input from diversity combining filter 10 is appropriately weighted at multiplier 55 by a reflection coefficient identified as $-K_2^*$ (in accordance with well-known notation, the reflection coefficient $-K_2^*$ represents the complex conjugate of the reflection coefficient $-K_2$). The weighted output signal from multiplier 55 is appropriately summed at summation network 56 with the delayed input $\beta_2(k)$ from diversity combining filter, the summed output, designated as $\beta_1(k)$, thereupon being delayed by another $\tau$ delay period for supply as one input to multiplier 54. Such input is then appropriately multiplied by a suitable reflection coefficient identified as $-K_1$ for supplying one of the inputs to summation network 53. The signals $\beta_2(k)$ and $\beta_1(k)$ can be referred to as backward error residuals, while the signals $\gamma_0(k)$, $\gamma_1(k)$ and $\gamma_2(k)$ can be referred to as forward error residuals.

Figure 7:
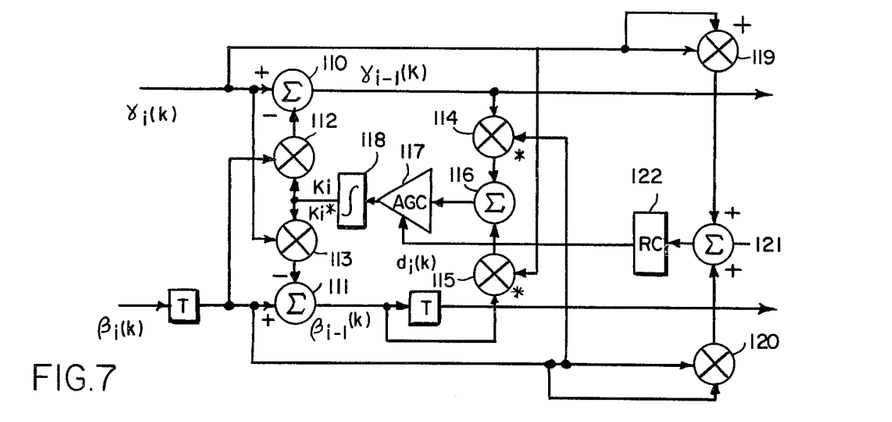
FIG. 7 shows a block diagram of the circuitry for generating certain coefficients required in the lattice filter of FIGS. 5 and 6.

The reflection coefficients, K, are determined as shown in FIG. 7, wherein the lattice filter portion 50 is partiallly reproduced. The circuit of FIG. 7 represents a generalized technique for determining $K_i$ and $K_i^*$. For example, to determine $K_2$ and $K_2^*$ the summation circuits 110 and 111 of FIG. 7 are equivalent to summers 52 and 56, respectively, of FIG. 5 and multipliers 112 and 113 are equivalent to multipliers 51 and 55, respectively. As can be seen in FIG. 7, the output $\gamma_{i-1}(k)$ of summer 110, is multiplied by the complex conjugate of the delayed backward error residual $\beta_i(k)$ at multiplier 114, while the complex conjugate output of summer 111 is multiplied by the forward error residual $\gamma_i(k)$ at multiplier 115. The multiplier outputs are then summed at summer 116 and supplied to AGC amplifier 117 and integrator 118 to form the desired reflection coefficients $K_i$ and $K_i^*$ as required.

The gain of AGC amplifier 117 is controlled in such a manner that it is set inversely proportional to the gain control signal $d_i(k)$, the latter signal being obtained as follows. The forward error residual is multiplied by its complex conjugate at multiplier 119, effectively providing the square thereof, while a similar process is used to obtain the square of the delayed backward error residual at multiplier 120. Such squared values of the forward and backward error residuals are summed at summer 121 and the output smoothed by an R-C circuit 122 to provide the desired control signal $d_i(k)$. The coefficients $K_i(k)$ are thereby generated from the forward and backward error residuals in such a way that an uncorrelated set of such residuals results.

The forward error residuals are utilized in FIG. 5 to generate appropriate weighting functions $W_0$, $W_1$ and $W_2$. The use of forward error residuals for weighting can be contrasted with lattice filter operations shown in the prior art. For example, in the article "Channel Equalization Using Adaptive Lattice Algorithms," by E. H. Satorius and S. T. Alexander, IEEE Transactions on Communications, Vol. COM-27, No. 6, June 1979, pp. 899–905, weighting is achieved by using backward error residuals. Further, Satorius et al. show no use of a lattice filter in combination with a decision feedback circuit, such as a backward filter, as shown in FIG. 5. When a backward filter equalizer is used, as in the circuitry shown here, it is found that the use of forward error residuals for weighting avoids the accumulation of errors due to noise which results from the adaptation of the reflection coefficients, which noise error accumulation would occur if backward error residuals are used as suggested by Satorius et al.

Figure 8:
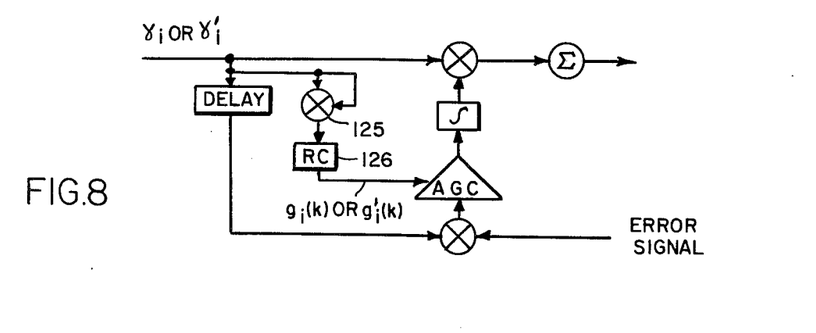
FIG. 8 shows a generalized block diagram of circuitry for generating the control signals for certain AGC amplifiers of FIGS. 5 and 6.

Thus, in order to provide the desired weighting, $\gamma_2(k)$ is delayed by $2\tau$, designated by $\gamma_2(k-2)$, and supplied as one input $\gamma_2(k-2)$ to multiplier 60 via a further delay circuit 60A, the other input of which is supplied from error generator 15 (see FIGS. 1-3). Delay circuit 60A is required to compensate for the component delays which are generated by the use of the components such as the data detector 14, required to generate the error signal. The output of multiplier 60 is supplied to integrator 61 via AGC amplifier 61A to produce the weight coefficient $W_0$ which is used to weight the delayed forward error residual $\gamma_2(k-2)$ at multiplier 62 to produce a weighted signal for supply to a summation circuit 63. The gain of AGC amplifier 61A is controlled by control signal $g_2(k)$. In a similar manner $\gamma_1(k)$ is delayed by $\tau$ to produce $\gamma_1(k-1)$ and utilized via delay circuit 65A, multiplier 65, AGC amplifier 66A and integrator 66 to form weighted coefficient $W_1$ for weighting the delayed $\gamma_1(k-1)$ signal at multiplier 67 to produce a second input to summation circuit 63. $\gamma_0(k)$ is used for form a weighted coefficient $W_2$ via delay circuit 68A, multiplier 68, AGC amplifier 69A and integrator 69 for weighting $\gamma_0(k)$ at multiplier 70, the output thereof being summed with the output of summer 63 at summation circuit 71. The AGC control signals $g_0(k)$, $g_1(k)$ and $g_2(k)$ are generated as shown in FIG. 8, wherein the forward error residual $\gamma_i(k)$ is squared at multiplier 125 and smoothed at R-C circuit 126 to produce $g_i(k)$.

The lattice filter acts to produce a set of uncorrelated forward error residuals $\gamma_2(k-2)$, $\gamma_1(k-1)$, and $\gamma_0(k)$ for rapid adaptation of the weights $W_0$, $W_1$ and $W_2$, respectively. Lattice filter 20 thereby supplies a weighted signal in which future ISI is effectively eliminated, which weighted signal is effectively combined with the weighted signals obtained at backward filter 21 to form the input to data detector 14. The decision feedback operation of backward filter 21 is substantially similar to that described in the aforementioned Monsen U.S. patent in which the data output signal is appropriately delayed and combined with the error signal from error generator 15 via multipliers 72 and 73 and integrator circuits 74 and 75, respectively, to produce weighted coefficients $W_{-2}$ and $W_{-1}$. Such weighted coefficients are used to weight the appropriately delayed data output signals at multipliers 76 and 77, respectively, the weighted signals then being suitably summed with the output of lattice filter 20 at summation circuits 78 and 79, respectively, to form the overall weighted signal at the input to data detector 14. The weighting signals $S_{k-1}$ and $S_{k-2}$, in the backward filter are delayed versions of the detector decisions. In most applications the transmitted data is uncorrelated from symbol to symbol so that the detector decisions are also uncorrelated, which insures rapid adaptation of the weights within the backward filter.

Backward filter 21 effectively eliminates past ISI, so that the overall operation of lattice filter 20 and backward filter 21 assures that forward ISI and past ISI are both eliminated from the data output signal from detector 14. Detector 14 can be of the type shown, for example, in the aforementioned U.S. issued patent of Monsen, an exemplary embodiment thereof being depicted in FIG. 5 of such patent.

In the lattice filter 20 configuration of FIG. 5, the weight signals (i.e., the signals to be weighted) $\gamma_2(k-2)$, $\gamma_1(k-1)$ and $\gamma_0(k)$ are not correlated so that an error signal which changes any one of the weights by correlation with one of these signals does not affect the value of the remaining ones. In a similar manner in the backward filter 21 weight signals are generally uncorrelated and an error signal which changes one weight also does not affect the other. Such lack of correlation among the signals within the lattice filter 21 or within the backward filter 21 provides for a more rapid error convergence so that the data output signal more rapidly converges to a replica of the input signal than is possible with the aforementioned prior art circuitry wherein the signals thereof are correlated and convergence cannot be achieved as rapidly.

Figure 6:
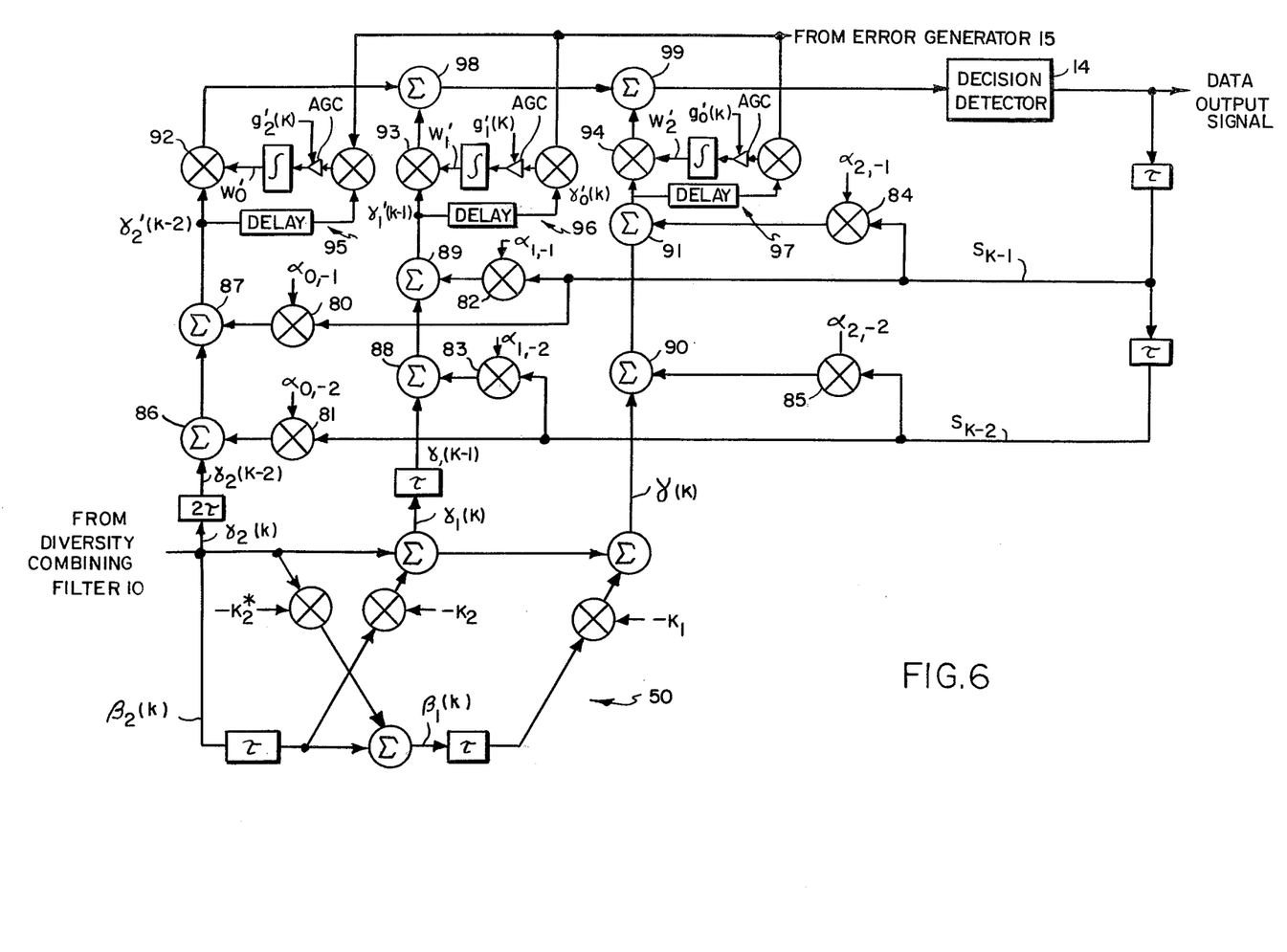
FIG. 6 shows a more specific block diagram of a portion of the system of FIG. 3.

While essentially no correlation exists among the signals within such filter itself in FIG. 5, there may be some correlation between the lattice filter signals and the backward filter signals. Such correlation tends to be relatively insignificant in many, if not most, applications. However, in some highly specialized applications, it may be desirable further to eliminate completely any coupling between the two filter operations. Such an embodiment is shown in FIG. 6 in which the overall circuitry eliminates both future and past intersymbol interference (and corresponds to the overall block diagram shown in FIG. 3) while at the same time eliminating any coupling between the circuitry used for eliminating future ISI and the circuitry used for eliminating past ISI. The embodiment of FIG. 6, like that of FIG. 5, represents a lattice filter used with decision feedback circuitry. In contrast, while the decision feedback circuitry is represented by the backward filter 21 in FIG. 5, such decision feedback operation is achieved by the generation of the $\alpha$-coefficients in FIG. 6, as discussed in more detail below.

As can be seen in FIG. 6, lattice filter portion 50 is generally of the same configuration as shown in FIG. 5 utilizing reflection coefficients $-K_1$, $-K_2$ and $-K_2^*$ to form forward error residuals $\gamma_0(k)$, $\gamma_1(k)$ and $\gamma_2(k)$ as discussed with reference to FIG. 5. However, a different approach to forming the desired weighting coefficients is depicted and the backward filter 21 is eliminated, the $\alpha$-coefficient feedback circuit being used instead. Thus, the signal weighting is performed in the forward signal path (for $W_0'$, $W_1'$ and $W_2'$) and the decision feedback operation is achieved in the feedback signal path in which the specific reflection coefficients $\alpha_{0,-1}'$ $\alpha_{0,-2}'$ $\alpha_{1,-1}'$ $\alpha_{1,-2}'$ $\alpha_{2,-1}$ and $\alpha_{2,-2}$ are generated for the particular embodiment shown.

In the circuit of FIG. 6 the appropriately delayed data output signal is multiplied by the above mentioned $\alpha$-reflection coefficients, as shown at multipliers 80–85. The output signals from such multipliers are suitably summed with corresponding forward error residuals $\gamma_0$, $\gamma_1$ and $\gamma_2$, suitably delayed as shown at summing circuits 86–91. The outputs of summing circuits 87, 89 and 91 are weighted at multipliers 92, 93 and 94 by weights $W_0'$, $W_1'$ and $W_2'$, respectively. These outputs $\gamma_2'$, $\gamma_1'$, $\gamma_0'$ are uncorrelated which allows for faster adaptation. The weighting coefficients therefor ($W_0'$, $W_1'$ and $W_2'$) are suitably generated from the summation signals and the error signal from error generator 15, as shown, by suitable delay, multiplier, AGC amplifier, and integrator circuits 95, 96 and 97, respectively, in generally the same manner as discussed above with respect to te system of FIG. 5. In FIG. 6, the AGC control signals, designated as $g_0'(k)$, $g_1'(k)$ and $g_2'(k)$, can be generated by circuits shown generally in FIG. 8 by squaring the forward error residuals $\gamma_i'(k)$ as at multiplier 125 and smoothing the squared output by R-C circuit 126 to form $g_i'(k)$. The weighted signals from multipliers 92, 93 and 94 are suitably summed at summing circuits 98 and 99 to form the input to data decision detector 14, as depicted in FIG. 6, the output of which is the desired quantized data output signal.

The system of FIG. 6 effectively eliminates any correlation between any of the weighted signals $\gamma_0'$, $\gamma_1'$, $\gamma_2'$ so that a change in one of the weights $W_0'$, $W_1'$, $W_2'$ can be effected without changing the remaining ones. Further, not only are future ISI and past ISI eliminated, but any coupling between the processes used for such elimination is also avoided. Such a system produces a relatively fast error convergence so that the data output signal converges to the desired replica of the input signal in extremely rapid fashion. A comparison of FIGS. 5 and 6 shows that while FIG. 6 eliminates the coupling that would exist between the forward filter and backward filter operations of FIG. 5, as discussed above, it does so at the expense of requiring a generally more complicated configuration requiring in effect a larger number of weighting functions (including the $\alpha$-reflection coefficients) than is required in FIG. 5. In some applications, however, only by using such additional complexity can the desired results be achieved. For many applications, however, the coupling between lattice filter 20 and backward filter 21 of FIG. 5 is sufficiently small that the simpler configuration of FIG. 5 will usually be suitable. While the circuits of FIGS. 5 and 6 can both be characterized as "orthogonal" circuits, the circuit of FIG. 5 can be designated as a "partitioned orthogonal" circuit while that of FIG. 6 can be designated as a "complete orthogonal" circuit.

Figure 9:
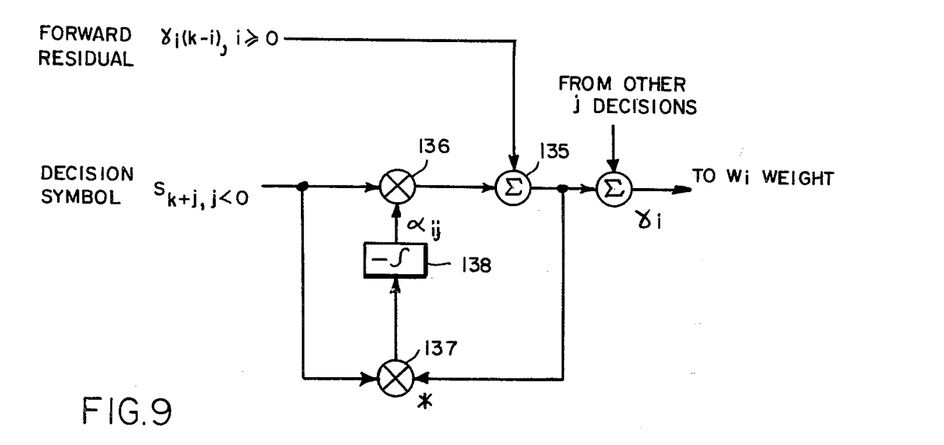
FIG. 9 shows a generalized block diagram of circuitry for generating the $\alpha$-coefficients of FIG. 6.

In the system of FIG. 6 discussed above, the $\alpha$-coefficients can be generated by depicted in FIG. 9. The latter figure shows a generalized circuit for providing the coefficient $\alpha_{i,j}$. The delayed forward error residual $\gamma_i(k-1)$, where $i<0$, is applied to summation circuit 135. The decision delayed decision signal $S_{k+j}$, where $j<0$, is supplied to one input of a multiplier 136 and to one input of a multiplier 137. The other input of multiplier 137 is a feedback signal which is the complex conjugate of the output of summer 135. The output of multiplier 137 is integrated by integrator circuit 138 to form the coefficient $\alpha_{ij}$ for supply to the other input of multiplier 136. In the circuit of FIG. 9, for generating the reflection coefficient $\alpha_{1,-2}$, for example (where $i=1$ and $j=2$), the multiplier 136, summer 135 and summer 138 are equivalent to multiplier 81, summer 88 and summer 89, respectively, of FIG. 6.

The reference generator used in the above discussed embodiments of the invention can be implemented in a manner well known to the art. One convenient technique, for example, is to time-division multiplex (TDM) a known symbol sequence from a pseudo-random generator with the information symbols which are being transmitted. Identical reference generators are used at the transmitter and at the receiver and are first synchronized in accordance with well known techniques and then the reference generator output is used whenever it appears in the TDM format.

Figure 10:
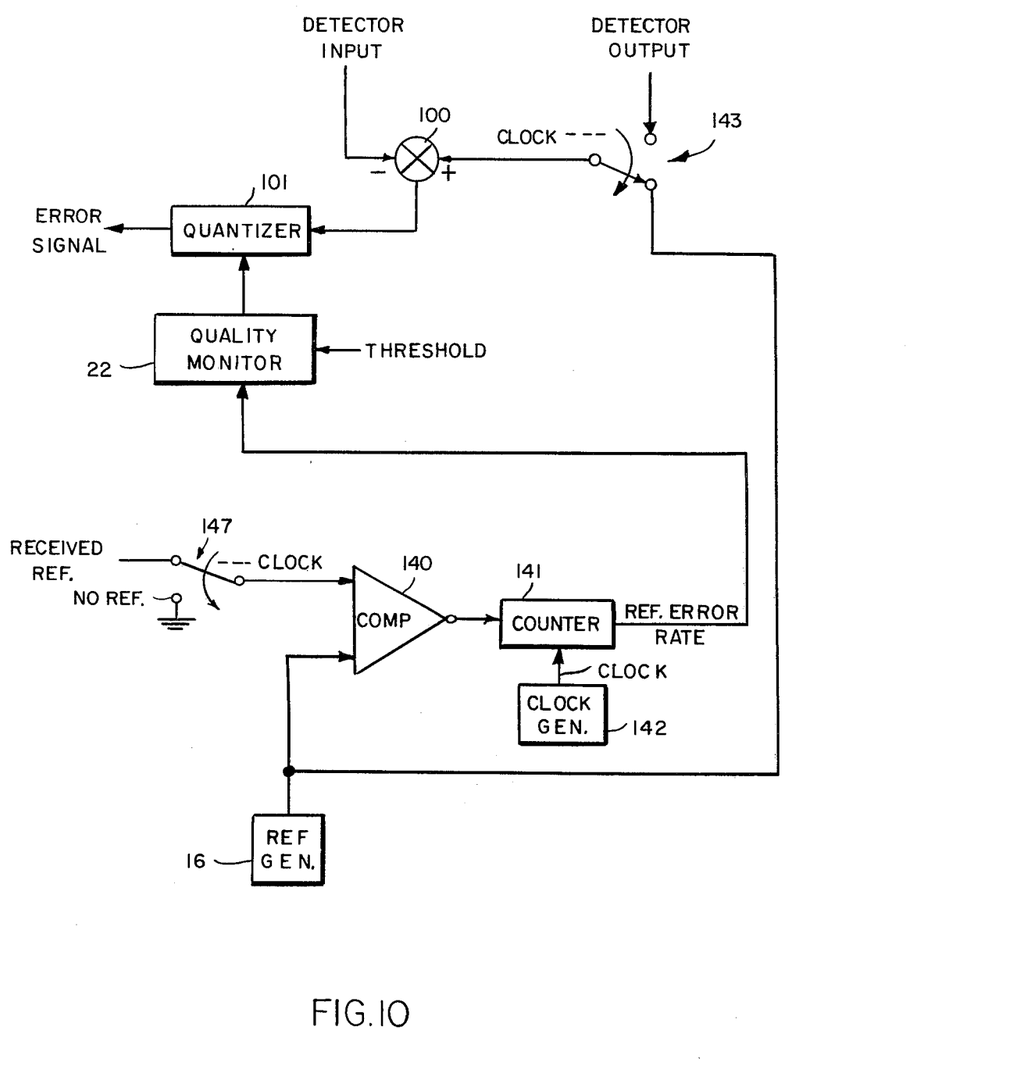
FIG. 10 shows a block diagram of an embodiment of the error signal generating circuitry which can be used in the systems of FIGS. 2 and 3.

With further reference to the error signal generator of FIGS. 2 and 3 (for supplying the error signal in FIGS. 5 and 6), a particular embodiment of an error generator circuit is shown in FIG. 10. The error can be derived either from the decision data from the output of detector 14 or from the reference signal from reference generator 16. For this purpose a switch 143 is used to switch from one to the other at the time-division multiplexed rate discussed above. Such switching rate is in accordance with a clock signal generated by a clock generator 142. For example, the overall duty cycle thereof may be such as to provide the detector output for 10 time units within a duty cycle and to provide the reference signal for 1 time unit thereof.

The decision data signal (or the reference signal) is supplied to one input of multiplier 100, the other input of which is supplied with the input signal to detector 14. The output of multiplier 100 is quantized at quantizer 101 and the quantized signal can be supplied as the error signal to the weighting circuits of FIGS. 5 and 6.

When the decision data is used to derive the error signal (i.e., when the reference signal is not used) but the quality of the error is below a selected threshold, it is desirable not to supply any error signal to the weight adaptive circuitry of FIGS. 5 and 6. Under such conditions the error signal is made zero, as discussed below.

The characteristic which is monitored to determine the desired quality is the error rate of the received reference signal. Such error rate is determined by comparing the received reference signal with the locally generated reference signal at comparator 140, the sign-reversed output of the comparator being supplied to a counter circuit 141 clocked at the same TDM rate discussed above. The output of the counter is the error rate which is monitored and compared to a selected threshold level. When the quality (error rate) is below such threshold a signal is supplied to quantizer 101 which can include appropriate combinatorial logic which provides a zero output therefrom when a signal is asserted at the output of quality monitor 22.

The threshold level can be empirically selected, for example, by the user of the system in accordance with the application in which the system is to be used.

While the embodiments shown in FIGS. 1-3 depict the use of a diversity combining filter bank 10, in some applications such filter may not be required and a system may achieve the desired ISI correction merely by using the lattice filter and decision feedback operations above, the appropriate input signal thereto being selected in accordance with conventional diversity signal handling techniques without the need for adaptive weighting thereof.

In further accordance with the invention, the adaptive matched filter can also be used as a diversity combiner in conjunction with the prior art forward equalizer circuit, and backward equalizer circuit, such as described in the aforesaid U.S. Pat. No. 3,879,664 with some special advantage due to the partitioning of the diversity combining and intersymbol interference removal functions. In this configuration only one forward equalizer circuit is required because the diversity combining operation has already been accomplished.

While the particular embodiments of the invention described above are preferred, modifications thereof may occur to those in the art within the spirit and scope of the invention. For example, the implementation of the required computations in the systems shown can be performed by well-known digital data processing techniques and components. Hence, the invention is not to be construed as limited to the techniques and components shown except as defined by the appended claims.

What is claimed is:

1. A receiver system for processing signals received in a plurality of diversity channels, said receiver system comprising adaptive matched filter means responsive to said received signals for providing a diversity combined received signal;
   means responsive to said diversity combined received signal for adaptively correcting for intersymbol interference in said received diversity signal, said adaptively correcting means including
   adaptive lattice filter means responsive to said diversity combined received signal for providing a plurality of error residual signals which form an uncorrelated set of signals, said lattice filter means using said uncorrelated error residual signals for producing an adaptively corrected signal in which future intersymbol interference and past intersymbol interference are substantially eliminated; and
   decision detector means responsive to said adaptively correcting means for producing a quantized data output signal.

2. A receiver system in accordance with claim 1 wherein said adaptive lattice filter means is a forward lattice filter means which responds to said diversity combined received signal to generate an adaptively corrected signal in which future and past intersymbol interference are substantially eliminated.

3. A receiver system in accordance with claim 2 and further including
   decision feedback means for providing decision feedback signals, and
   backward adaptive equalizer filter means responsive to said decision feedback signals for eliminating said past intersymbol interference.

4. A receiver system in accordance with claim 3 wherein said decision feedback means is an adaptive feedback circuit said circuit being arranged so that coupling between the operation of said lattice filter means and said adaptive circuit is effectively eliminated.

5. A receiver system in accordance with claim 3 wherein said system includes
   means for producing an error signal; and further wherein
   said lattice filter means comprising
   means responsive to said diversity combined received signal for providing a plurality of forward error residual signals;
   means responsive to said forward error residual signals and to said error signal for producing a plurality of weighting coefficients;
   means responsive to said weighting coefficients and to said forward error residual signals for providing a plurality of weighted signals;
   means for combining said plurality of weighted signals to produce a first weighted signal;
   said backward adaptive equalizer filter includes
   means responsive to said quantized data output signal and to said error signal for providing a plurality of backward weighting coefficients; and
   means responsive to said quantized data output signal and to said backward weighting coefficients for producing a plurality of backward weighted signals; and
   means for combining said plurality of backward weighted signals with said first weighted signal for producing a combined weighted signal which is adaptively corrected and in which future intersymbol interference and past intersymbol interferences are substantially eliminated, said decision detector means being responsive to said combined weighted signal to produce said quantized data output signal.

6. A receiver system in accordance with claim 5 for receiving data signals and a reference signal from a transmitter system through a medium, said receiver system further including
   means for producing a receiver reference signal which is synchronous with said transmitter reference signal; and further wherein
   said error signal producing means includes
   means for producing said error signal in selective response to said quantized output signal or to said receiver reference signal.

7. A receiver system in accordance with claim 6 and further including
   means for monitoring the quality of the transmitter reference signal which is received at said receiver system when said error signal is produced in response to said quantized data output signal; and means for reducing said error signal from said error signal producing means to zero when said monitored quality is below a selected threshold.

8. A receiver system in accordance with claim 1 and further including decision feedback means for providing decision feedback signals and further wherein said lattice filter means is responsive to both said diversity combined received signal and to said decision feedback signals for providing an adaptively corrected signal in which future and past intersymbol interferences are substantially eliminated.

9. A receiver system in accordance with claim 8 wherein said system includes means for producing an error signal; and further wherein said lattice filter means includes means responsive to said diversity combined received signal for providing a plurality of forward error residual signals;

means responsive to said quantized data output signal for providing a plurality of adaptive coefficients;

means responsive to said forward error residual signals and to said adaptive coefficients for providing a plurality of weighted forward error residual signals; and said lattice filter means further includes means for combining said weighted signals for producing a combined weighted signal which is adaptively corrected and in which future intersymbol interference and past intersymbol interference are substantially eliminated, said decision detector means being responsive to said combined weighted signal to produce said quantized data output signal.

10. A receiver system in accordance with claim 9 for receiving data signals and a reference signal from a transmitter system through a medium, said receiver system further including means for producing a receiver reference signal which is synchronous with said transmitter reference signal; and further wherein said error signal producing means includes means for producing said error signal in selective response to said quantized output signal or to said receiver reference signal.

11. A receiver system in accordance with claim 10 and further including means for monitoring the quality of the transmitter reference signal which is received at said receiver system when said error signal is produced in response to said quantized data output signal; and means for reducing said error signal from said error signal producing means to zero when said monitored quality is below a selected threshold.

* * * * *